United States Patent
Eizenga et al.

(10) Patent No.: US 9,416,321 B2
(45) Date of Patent: Aug. 16, 2016

(54) SEPARATION PROCESS WITH MODIFIED ENHANCED HOT SEPARATOR SYSTEM

(75) Inventors: Donald A. Eizenga, Elk Grove Village, IL (US); Mark Van Wees, Des Plaines, IL (US); Paul C Steacy, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 817 days.

(21) Appl. No.: 13/475,075

(22) Filed: May 18, 2012

(65) Prior Publication Data
US 2013/0305593 A1 Nov. 21, 2013

(51) Int. Cl.
| | |
|---|---|
| *C10G 3/00* | (2006.01) |
| *B01D 19/00* | (2006.01) |
| *C10G 45/58* | (2006.01) |
| *C10G 69/06* | (2006.01) |

(52) U.S. Cl.
CPC .............. *C10G 3/00* (2013.01); *B01D 19/0005* (2013.01); *C10G 45/58* (2013.01); *C10G 69/06* (2013.01); *C10G 2300/1011* (2013.01); *Y02P 30/20* (2015.11)

(58) Field of Classification Search
CPC ........................ C10L 2200/0469; Y02E 50/10
USPC ..................................... 44/307; 585/240, 734
See application file for complete search history.

(56) References Cited

U.S. PATENT DOCUMENTS

| | | | |
|---|---|---|---|
| 4,925,573 A | 5/1990 | Vorlow | |
| 7,816,570 B2 * | 10/2010 | Roberts et al. ................ | 585/240 |
| 7,960,520 B2 * | 6/2011 | McCall et al. ................ | 530/503 |
| 7,982,078 B2 * | 7/2011 | Brady et al. ................... | 585/240 |
| 8,236,999 B2 * | 8/2012 | Parimi et al. .................. | 585/240 |
| 8,314,274 B2 * | 11/2012 | Marker et al. ................ | 585/240 |
| 8,329,970 B2 * | 12/2012 | Harlin et al. .................. | 585/240 |
| 8,431,756 B2 * | 4/2013 | Roberts et al. ................ | 585/240 |
| 8,523,959 B2 * | 9/2013 | O'Rear ........................... | 44/308 |
| 8,608,812 B2 * | 12/2013 | Perego et al. .................. | 44/307 |
| 8,623,102 B2 | 1/2014 | Quignard et al. | |
| 8,859,831 B2 * | 10/2014 | Marker et al. ................ | 585/240 |
| 2009/0300970 A1 | 12/2009 | Perego | |
| 2011/0245553 A1 | 10/2011 | Kalnes et al. | |
| 2012/0047793 A1 | 3/2012 | Murty et al. | |
| 2012/0151828 A1* | 6/2012 | Kalnes ............................ | 44/308 |

FOREIGN PATENT DOCUMENTS

| | | | |
|---|---|---|---|
| WO | WO 03/080769 A1 | 10/2003 | |
| WO | 2010077395 A1 | 7/2010 | |
| WO | 2011053166 A1 | 5/2011 | |
| WO | WO2012052116 A2 | 4/2012 | |

OTHER PUBLICATIONS

EP Search Report dated Dec. 9, 2015.

* cited by examiner

*Primary Examiner* — Ellen McAvoy

(57) ABSTRACT

A separation process with a modified enhanced hot separator system is described. The process eliminates undesirable entrainment while allowing for enhanced stripping of the net liquid only. The modified enhanced hot separator system combines a hot separator with a hot stripping column.

9 Claims, 3 Drawing Sheets

SEPARATION PROCESS WITH MODIFIED ENHANCED HOT SEPARATOR SYSTEM

FIELD OF THE INVENTION

This invention relates generally to hydroprocessing technologies, and more particularly to a separation process including a modified enhanced hot separator system.

BACKGROUND OF THE INVENTION

Various hydroprocessing technologies have proposed the use of an enhanced hot separator (EHS) in the reactor effluent system. The function of the EHS is to strip a certain amount of light material out of the liquid phase reactor effluent stream. The EHS typically combines gross separation of recycle vapor from liquid within a packed or trayed stripping column that achieves additional vapor stripping.

However, the liquid component fed to the EHS may contain recycle liquid which does not need to be stripped. In this case, the quantity of stripping vapor required may limit the performance of the system. In addition, there is an increased risk for liquid drop entrainment from the gross separation section.

SUMMARY OF THE INVENTION

One aspect of the invention is a process for separating a first reaction zone effluent. In one embodiment, the process includes separating the first reaction zone effluent in a first vapor-liquid separator into a vapor stream and a liquid stream. The liquid stream is divided into a recycle portion and a product portion. The product portion of the liquid stream is stripped in a stripping column with a stripping gas into an overhead vapor stream and a bottoms stream. The bottoms stream is introduced into a second reaction zone, and the recycle portion of the liquid stream is recycled to the first reaction zone.

DETAILED DESCRIPTION OF THE INVENTION

Figure 1:
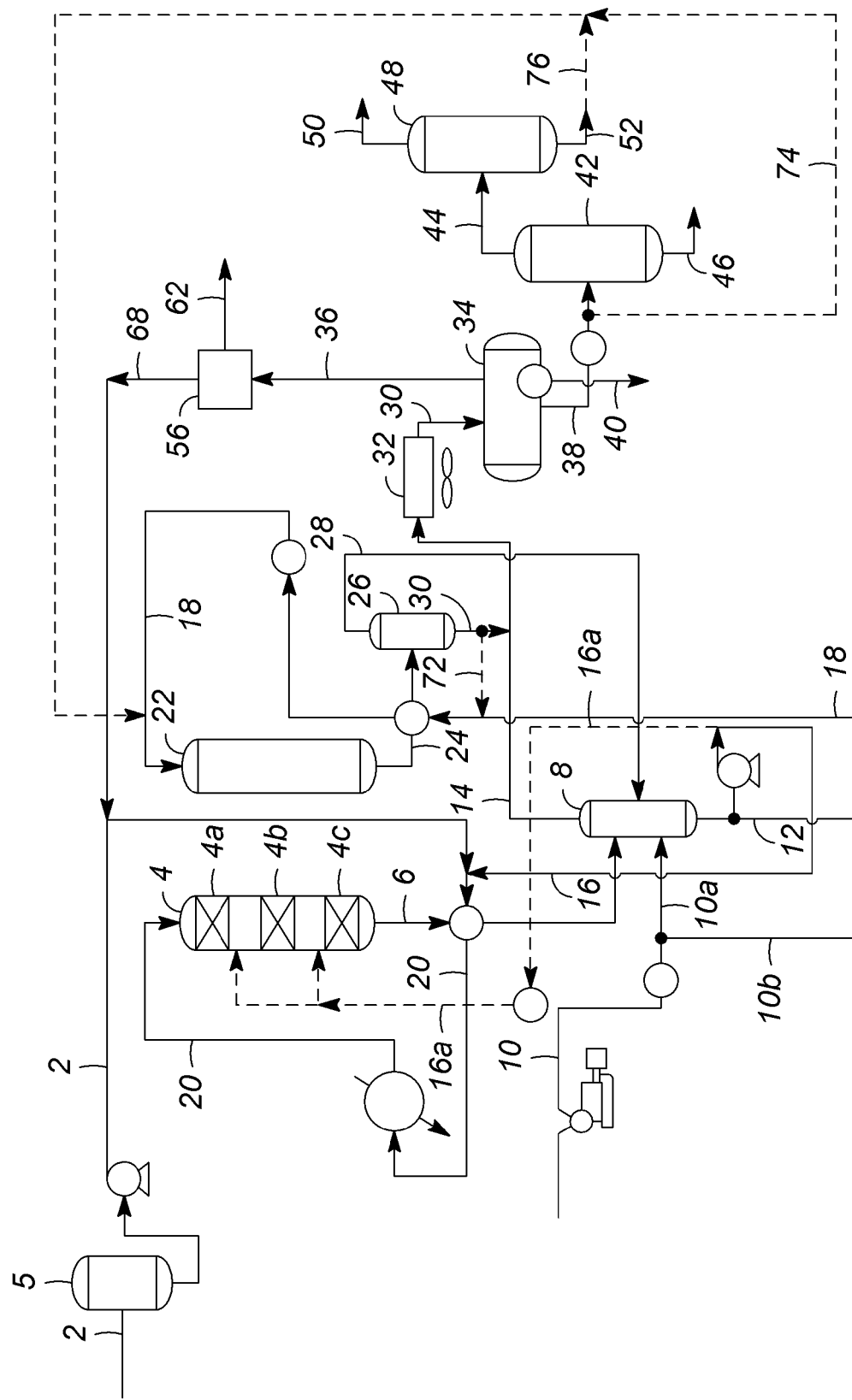
FIG. 1 is an illustration of one embodiment of a hydroprocessing process including an enhanced hot separator.

The present invention relates to a modified enhanced hot separator system which eliminates undesirable entrainment while allowing for enhanced stripping of the net liquid only. The system combines a hot separator with a hot stripping column.

The first component in the system is a hot separator (e.g., a vapor-liquid separator) to achieve the gross liquid and vapor separation. By having a separate vessel, traditional vapor-liquid separation design practices can be used to ensure a good split with minimal entrainment. The hot separator is typically operated at a temperature in the range of about 40° C. to about 350° C., or about 150° C. to about 250° C., or about 180° C. to about 220° C. The hot separator is desirably operated at a temperature which will keep the hydrocarbon component in liquid form. Although the hot separator can be run at temperatures down to about 40° C., lower temperatures decrease the energy efficiency of the system.

The liquid from the hot separator is then split into a recycle liquid stream, which is recycled, and a net liquid stream, which is fed to a hot stripping column. For a fixed quantity of stripping vapor, the hot stripping column will be more effective at stripping net liquid compared to stripping the combined recycle and net liquid.

The temperature of the hot stripping column may be controlled in a limited range to achieve the desired separation, and the pressure may be maintained at approximately the same pressure as the reaction zones before and after the modified enhanced separator system to minimize both investment and operating costs. The hot high pressure hydrogen stripping column may be operated at conditions ranging from a pressure of about 689 kPa absolute (100 psia) to about 13,790 kPa absolute (2000 psia), and a temperature of about 40° C. to about 350° C. In another embodiment, the hot high pressure hydrogen stripping column may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripping column may be operated at essentially the same pressure as the reaction zone. By "essentially", it is meant that the operating pressure of the hot high pressure hydrogen stripping column is within about 1034 kPa absolute (150 psia) of the operating pressure of the reaction zone. For example, in one embodiment the hot high pressure hydrogen stripping separation zone is no more than about 1034 kPa absolute (150 psia) less than that of the reaction zone.

FIG. 1 illustrates one example of a hydroprocessing process including an unmodified EHS. As shown, the process begins with a feedstock stream 2 which may pass through an optional feed surge drum. The feedstock stream 2 is combined with recycle gas stream 68 and recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown in FIGS. 1 as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor 4. Stream 6 comprises a liquid component containing largely normal paraffin hydrocarbons in the diesel boiling range and a gaseous component containing largely hydrogen, vaporous water, carbon monoxide, carbon dioxide, propane, and possibly ammonia.

Deoxygenation reactor effluent stream 6 is then directed to hot high pressure hydrogen stripping column 8. Make up hydrogen in line 10 is divided into two portions, streams 10a and 10b. Make up hydrogen in stream 10a is also introduced to hot high pressure hydrogen stripping column 8. In hot high pressure hydrogen stripping column 8, the gaseous component of deoxygenation reactor effluent 6 is selectively stripped from the liquid component of deoxygenation reactor effluent 6 using make-up hydrogen 10a and recycle hydrogen 28. The dissolved gaseous component comprising hydrogen, vaporous water, carbon monoxide, carbon dioxide, and ammonia is selectively separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripping column bottoms stream 12.

A portion of hot high pressure hydrogen stripping column bottoms 12 forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and/or between beds 4b and 4c to aid in temperature control, for example. The remainder of hot high pressure hydrogen stripping column bottoms in stream 12 is combined with hydrogen stream 10b to form combined stream 18 which is routed to isomerization reactor 22. Stream 18 may be heat exchanged with isomerization reactor effluent 24.

The product of the isomerization reactor containing a gaseous portion of hydrogen and a branched-paraffin-rich liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripping column 8 as part of the stripping gas. Bottoms stream 30 from hydrogen separator 26 is air cooled using air cooler 32 and introduced into product separator 34. In product separator 34, the gaseous portion of the stream comprising hydrogen, carbon monoxide, hydrogen sulfide, carbon dioxide, propane, and ammonia are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44 with the remainder, the diesel range components, being withdrawn from product stripper 42 in line 46. Stream 44 is introduced into fractionator 48 which operates to separate LPG into overhead 50 leaving a naphtha bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, and carbon dioxide and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through an amine absorber, also called a scrubber, in zone 56. The carbon dioxide is absorbed by the amine, while the hydrogen passes through the amine scrubber zone and into line 68 to be recycled to the first reaction zone. The amine is regenerated, and the carbon dioxide is released and removed in line 62. Within the amine absorber zone, regenerated amine may be recycled for use again.

The hot stripping column can reduce contaminants contained in the isomerization reactor feed. For example, Table 1 shows the results for a computer simulation of the reduction in impurities using a hot stripping column for a feed containing 1100 ppm (wt) N and 1500 ppm (wt) S. Medium stripping is a base flow rate for the stripping gas, with low stripping being one half the base, and high stripping being twice the base.

TABLE 1

| Contaminant | High Stripping (ppm-wt) | Medium Stripping (ppm-wt) | Low Stripping (ppm-wt) | No stripping (ppm-wt) |
| --- | --- | --- | --- | --- |
| $H_2O$ | <1 | ~10 | 180 | 1100-1300 |
| $H_2S$ | 1 | ~2 | ~2- | 32-80 |
| CO | <<1 | 0.1 | <1 | 100 |
| $NH_3$ | 1.5 | ~4 | ~20 | ~30-60 |

However, in some cases, it would be desirable to have lower levels of contaminants than are obtainable using the hot stripping column alone. By combining a hot separator with a hot stripping column, greater reduction in contaminants is possible. Some contaminants can be reduced to levels in the range of parts per billion (ppb-wt). The level for one or more contaminants can be less than 750 ppb-wt, or less than 600 ppb-wt, or less than 500 ppb-wt, or less than 400 ppb-wt, or less than 300 ppb-wt, or less than 250 ppb-wt, or less than 200 ppb-wt, or less than 150 ppb-wt, or less than 100 ppb-wt. The reduction in some contaminants with the modified enhanced separator system can be 10 times better than with the hot stripping column alone, or 100 times better, or 250 times better, or 500 times better, or 1000 times better.

Figure 2:
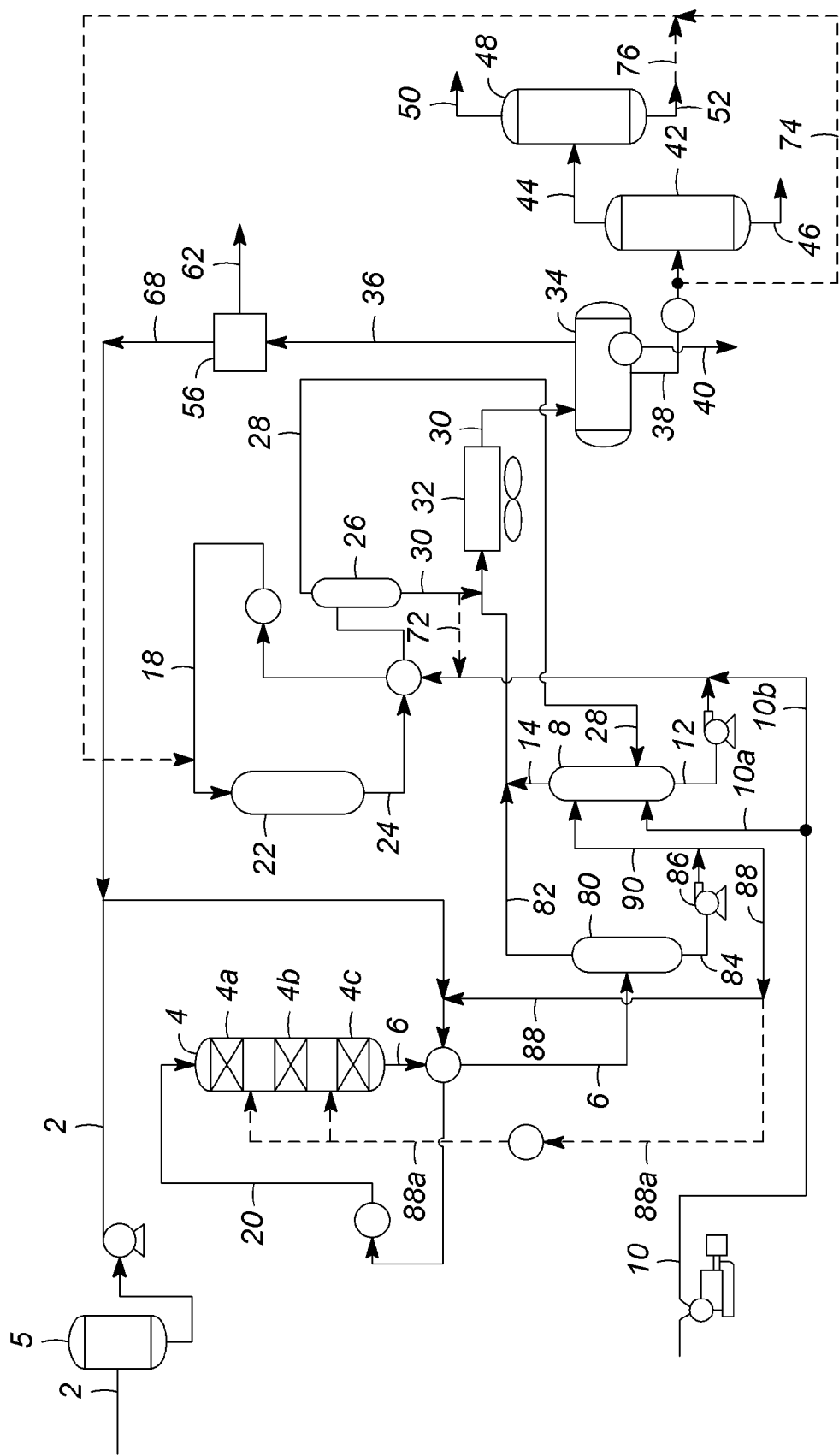
FIG. 2 is an illustration of the hydroprocessing process of FIG. 1 including a modified enhanced hot separator system.

The modified enhanced hot separator system achieves lower levels of contaminants than is possible with the hot stripping column. In the embodiment of the modified enhanced separator system shown in FIG. 2, there is a hot separator 80, which is a vapor-liquid separator, which separates the reactor effluent stream 6 into a vapor stream 82 and a liquid stream 84. After flowing through pump 86, liquid stream 84 is separated into recycle stream 88 and product stream 90. Recycle stream 88 is sent to the deoxygenation reactor 4. Product stream 90 is sent to hot stripping column 8 where it is stripped into overhead stream 14 and bottoms stream 12. The vapor stream 82 from the hot separator 80 is combined with overhead stream 14 from hot stripping column 8 and bottoms stream 30 from hydrogen separator 26, cooled, and sent to product separator 34. Optionally, the stream could be contacted with a liquid sponge oil stream (not shown). This process is described in U.S. Publication 2012/0047793, which is incorporated herein by reference. The vapor stream 28 from the hydrogen separator 26 can supply some or all of the stripping gas for the hot stripping column 8.

For example, Table 2 shows the results of a similar computer simulation using the modified enhanced stripping system.

TABLE 2

| Contaminant | High Stripping (ppb-wt) | Low Stripping (ppb-wt) |
| --- | --- | --- |
| $H_2O$ | <1 | 77 |
| $H_2S$ | <1 | 48 |
| $NH_3$ | <1 | 59 |

In some cases, the estimated level is lower than the limit of the detection method.

Figure 3:
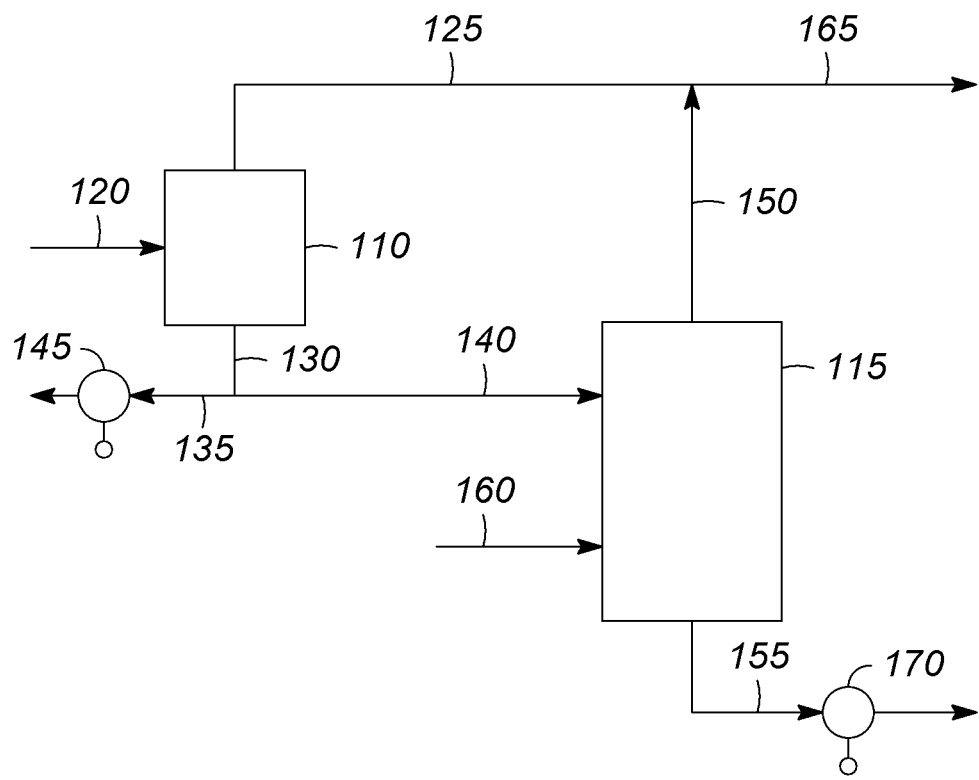
FIG. 3 is an illustration of one embodiment of a modified enhanced hot separator system.

In one embodiment of the modified enhanced hot separator system as shown in FIG. 3, the hot separator 110 is elevated above the hot stripping column 115. A liquid head is used to control the net liquid flow into the hot stripping column 115 (similar to a side stripper on a fractionation column). This minimizes the liquid pump capacity (CAPEX) and utility (OPEX), but increases vessel elevation. The outlet of the hot separator 110 is above the highest liquid inlet to the enhanced hot stripping column 115. The hot effluent 120 from a reactor flows into the hot separator 110 where it is separated into hot separator vapor 125, and liquid stream 130. The liquid stream 130 is divided into recycle liquid stream 135 and net sour liquid stream 140. Recycle liquid stream 135 flows through recycle liquid pump 145. Net sour liquid stream 140 enters hot stripping column 115 where it is separated into hot stripper vapor 150 and net stripped liquid 155. Stripping vapor 160 is introduced into hot stripping column 115. Hot stripper vapor 150 is combined with hot separator vapor 125 to form recycle gas stream 165. Net stripped liquid 155 flows through net liquid pump 170.

Figure 4:
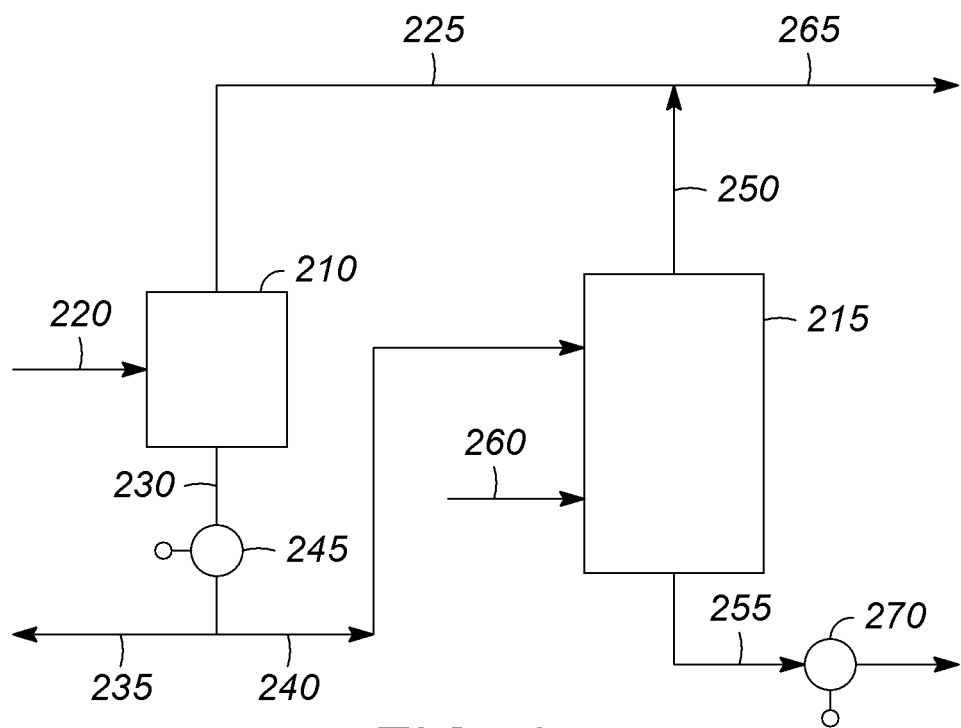
FIG. 4 is an illustration of another embodiment of a modified enhanced hot separator system.

In another embodiment of the modified enhanced hot separator system as shown in FIG. 4, the total hot separator liquid is pumped so that the hot separator vessel elevation and location are independent of the hot stripping column. This provides flexibility to the design and reduces the vessel elevation. However, it increases the liquid pump capacity and utility requirements. The hot effluent 220 from a reactor flows into the hot separator 210 where it is separated into hot separator vapor 225, and liquid stream 230. The liquid stream 230 flows through total liquid pump 245 and is divided into recycle liquid stream 235 and net sour liquid stream 240. Net sour liquid stream 240 enters hot stripping column 215 where it is separated into hot stripper vapor 250 and net stripped liquid 255. Stripping vapor 260 is introduced into hot stripper 215. Hot stripper vapor 250 is combined with hot separator vapor 225 to form recycle gas stream 265. Net stripped liquid 255 flows through net liquid pump 270.

The modified enhanced separator system can be used with a variety of processes. For example, it can be used in processes to produce green diesel from natural oils and fats. This process involves deoxygenating renewable feedstocks with carbon chain lengths in the diesel range to produce n-paraffins with both the same number of carbons as the fatty acid chain, or one carbon less if the oxygen was removed by decarboxylation or decarbonylation. In an optional second stage of the process, a portion of the n-paraffins are selectively isomerized to improve the cold properties of the resulting diesel.

Suitable renewable feedstocks include those originating from plants or animals. Some of these feedstocks are known as renewable fats and oils. The term renewable feedstock is meant to include feedstocks other than those obtained from petroleum crude oil. The renewable feedstocks that can be used in the present invention include any of those which comprise glycerides and FFA. Most of the glycerides will be triglycerides, but monoglycerides and diglycerides may be present and processed as well. Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, pennycress oil, palm oil, carinata oil, jojoba oil, mustard oil, cottonseed oil, jatropha oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The triglycerides and FFAs of the typical vegetable or animal fat contain aliphatic hydrocarbon chains in their structure which have about 8 to about 24 carbon atoms, with a majority of the fats and oils containing high concentrations of fatty acids with 16 and 18 carbon atoms. Mixtures or co-feeds of renewable feedstocks and petroleum derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. In some applications, an advantage of using a co-feed component is the transformation of what may have been considered to be a waste product from a petroleum based or other process into a valuable co-feed component to the current process.

The renewable feedstock can be pretreated to remove contaminants, such as alkali metals, e.g. sodium and potassium, phosphorous, gums, and water. Suitable pretreatments include, but are not limited to, contacting the renewable feedstock with one or more of a acid, a base, an extractive material, or an adsorptive material.

One possible pretreatment step involves contacting the renewable feedstock with an ion-exchange resin in a pretreatment zone at pretreatment conditions. In one embodiment, the ion-exchange resin is an acidic ion exchange resin such as Amberlyst™ 15 and can be used as a bed in a reactor through which the feedstock is flowed, either upflow or downflow.

Another possible method of removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed.

Hydroprocessing such as that described in U.S. Pat. No. 7,638,040 or 8,038,869, for example, each of which is, hereby incorporated by reference, are other pretreatment techniques which may be employed.

The renewable feedstock is sent to the hydroprocessing zone comprising one or more catalyst beds in one or more reactors. In the hydroprocessing zone, the feedstock is contacted with a hydrogenation or hydrotreating catalyst in the presence of hydrogen at hydrogenation conditions to hydrogenate the reactive components such as olefinic or unsaturated portions of the n-paraffinic chains. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina, titanium oxide or activated carbon.

Hydrogenation conditions include a temperature of about 40° C. to about 400° C. and a pressure of about 689 kPa absolute (100 psia) to about 13,790 kPa absolute (2000 psia). Other operating conditions for the hydrogenation zone are well known in the art. For hydrodeoxygenation, the conditions include a temperature of about 200° C. to about 400° C.

and a pressure of about 4137 kPa absolute (600 psia) to about 8274 kPa absolute (1200 psia). The hydrogen partial pressure is typically greater than about 3450 kPa absolute (500 psia). The ratio of $H_2$ to organic oxygen is generally greater than about 5, or greater than about 7, or greater than about 10. Suitable catalysts for hydrodeoxygenation include, but are not limited to, nickel or nickel/molybdenum containing catalysts. Some of the catalysts enumerated above are also capable of catalyzing decarboxylation, and decarbonylation in addition to hydrodeoxygenation of the feedstock to remove oxygen. Decarboxylation, decarbonylation, and hydrodeoxygenation are collectively referred to as deoxygenation reactions. In some situations, decarboxylation and decarbonylation can be less desirable because of the loss of renewable carbon feedstock to CO and $CO_2$. Decarboxylation conditions include a relatively low pressure of about 689 kPa (100 psia) to about 6895 kPa (1000 psia), a temperature of about 300° C. to about 450° C. and a liquid hourly space velocity of about 0.5 to about 10 $hr^{-1}$. Since hydrogenation is an exothermic reaction, as the feedstock flows through the catalyst bed, the temperature increases and decarboxylation and hydrodeoxygenation will begin to occur. Thus, it is envisioned and is within the scope of this invention that all the reactions occur simultaneously in one reactor or in one bed.

Alternatively, the conditions can be controlled such that hydrogenation primarily occurs in one bed and decarboxylation and/or hydrodeoxygenation occurs in a second bed. Of course, if only one bed is used, then hydrogenation occurs primarily at the front of the bed, while decarboxylation/hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor.

The effluent from the deoxygenation zone is conducted to the modified enhanced hot separator system, as described above. The reaction product from the deoxygenation reactions will comprise both a liquid portion and a gaseous portion. The liquid portion comprises a hydrocarbon fraction which is essentially all n-paraffins and has a large concentration of paraffins in the range of about 9 to about 18 carbon atoms. The gaseous portion comprises hydrogen, carbon dioxide, carbon monoxide, water vapor, propane, and perhaps sulfur components, such as hydrogen sulfide or phosphorous components such as phosphine, or nitrogen compounds such as ammonia.

One purpose of the modified enhanced hot separator system is selectively to separate at least a portion of the gaseous portion of the effluent from the liquid portion of the effluent. Failure to remove the water, trace carbon monoxide, ammonia, and carbon dioxide from the effluent may result in poor catalyst performance in the isomerization zone. Water, carbon monoxide, carbon dioxide, and/or hydrogen sulfide are selectively stripped in the hot high pressure hydrogen stripper using hydrogen. The hydrogen used for the stripping may be dry, and free of carbon oxides.

The effluent from the deoxygenation reaction enters the hot separator where vapor-liquid separation takes place. Part of the liquid is recycled while the remainder is sent to the hot high pressure stripping column. The vapor is cooled and sent to another vapor-liquid separator. The net liquid from the hot separator is stripped in the hot stripping column, and at least a portion of the gaseous components are carried with the hydrogen stripping gas and separated into an overhead stream. The remainder of the deoxygenation zone effluent stream is removed as hot high pressure hydrogen stripping column bottoms and contains the liquid hydrocarbon fraction having components such as normal hydrocarbons having from about 8 to about 24 carbon atoms. Different feedstocks will result in different distributions of paraffins. A portion of this liquid hydrocarbon fraction in hot high pressure hydrogen stripping column bottoms may be used as the hydrocarbon recycle described below.

Hydrogen may be separated from process effluent(s) and recycled to the hydrogenation and deoxygenation zone, or the amount of hydrogen may be in only slight excess, about 5 to about 25%, of the hydrogen requirements of the hydrogenation and deoxygenation reactions and therefore not recycled. Another refinery unit, such as a hydrocracker, may be used as a source of hydrogen, which potentially eliminates the need for a recycle gas compressor.

In one embodiment, the desired amount of hydrogen is kept in solution at lower pressures by employing a large recycle of hydrocarbon to the deoxygenation reaction zone. Other processes have employed hydrocarbon recycle in order to control the temperature in the reaction zones since the reactions are exothermic reactions. However, the range of recycle to feedstock ratios is determined not on temperature control requirements, but instead, based upon hydrogen solubility requirements. Hydrogen has a greater solubility in the hydrocarbon product than it does in the feedstock. By utilizing a large hydrocarbon recycle, the solubility of hydrogen in the combined liquid phase in the reaction zone is greatly increased, and higher pressures are not needed to increase the amount of hydrogen in solution. In one embodiment of the invention, the volume ratio of hydrocarbon recycle to feedstock is from about 2:1 to about 8:1, or about 2:1 to about 6:1. In another embodiment, the ratio is in the range of about 3:1 to about 6:1, and in yet another embodiment, the ratio is in the range of about 4:1 to about 5:1.

Although the hydrocarbon fraction separated in the hot high pressure hydrogen stripping column is useful as a diesel boiling range fuel, it will have poor cold flow properties because it comprises essentially n-paraffins. The hydrocarbon fraction can be contacted with an isomerization catalyst under isomerization conditions to selectively isomerize at least a portion of the n-paraffins to branched paraffins to improve the cold flow properties. The effluent of the isomerization zone is a branched-paraffin-rich stream. By the term "rich" it is meant that the effluent stream has a greater concentration of branched paraffins than the stream entering the isomerization zone, and can comprises greater than about 15 mass-branched paraffins. It is envisioned that the isomerization zone effluent may contain greater than about 20, or greater than about 30, or greater than about 40, or greater than about 50, or greater than about 60, or greater than about 70, or greater than about 75, or greater than about 80, or greater than about 90 mass-% branched paraffins.

Isomerization can be carried out in a separate bed of the same reaction zone, i.e., same reactor described above for deoxygenation, or the isomerization can be carried out in a separate reactor. For ease of description, an embodiment with a separate reactor for the isomerization reaction will be described. The hydrogen stripped product of the deoxygenation reaction zone is contacted with an isomerization catalyst in the presence of hydrogen at isomerization conditions to isomerize the normal paraffins to branched paraffins. Only minimal branching is required, enough to overcome the cold-flow problems of the normal paraffins. Because attempting to obtain significant branching runs the risk of undesired cracking, the predominant isomerized product is a mono-branched hydrocarbon.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include, but are not limited to, amorphous alumina, titanium oxide, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means an MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. Nos. 5,510,306, 5,082,956, and 5,741,759.

The isomerization catalyst may also comprise a modifier selected from lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and 5,851,949 are hereby incorporated by reference.

U.S. Pat. Nos. 5,444,032 and 5,608,968 teach a suitable bifunctional catalyst which is constituted by an amorphous silica-alumina gel and one or more metals belonging to Group VIIIA, and which is effective in the hydroisomerization of long-chain normal paraffins containing more than 15 carbon atoms. An activated carbon catalyst support may also be used. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art. Operating at low pressures allows for the optional introduction of hydrogen from another unit, such as a hydrogen plant, without the use of a make-up compressor which may be an option to reduce or eliminate hydrogen recycle. When hydrogen is not recycled, the amount of hydrogen introduced to the isomerization zone would be only slightly greater than that which is consumed, for example, an excess of about 5 to about 25 percent of the consumption requirements.

The final effluent stream, i.e., the stream obtained after all reactions have been carried out, is now processed through one or more separation steps to obtain a purified hydrocarbon stream useful as a transportation fuel. With the final effluent stream comprising both a liquid component and a gaseous component, various portions of which are to be recycled, multiple separation steps may be employed. For example, hydrogen may be first separated in an isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripping column for use both as a stripping gas and to combine with the remainder as a bottoms stream. The hydrogen can be either a portion of the stripping gas or all of it. Any remainder is passed to the isomerization reaction zone, and the hydrogen becomes a component of the isomerization reaction zone feed streams in order to provide the necessary hydrogen partial pressures for the reactor. The hydrogen is also a reactant in the deoxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the final effluent after the removal of hydrogen still has liquid and gaseous components and is cooled by techniques such as air cooling or water cooling, and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization. Prior to entering the cold separator, the remainder of the final effluent stream may be combined with the hot high pressure hydrogen stripper overhead stream, and the resulting combined stream may be introduced into the cold separator.

The liquid component contains the hydrocarbons useful as transportation fuel, termed fuel range hydrocarbons, as well as smaller amounts of naphtha and LPG. The separated liquid component may be recovered as diesel fuel, or it may be further purified in a product stripper which separates lower boiling components and dissolved gases into an LPG and naphtha stream from the jet fuel and diesel fuel products containing $C_8$ to $C_{24}$ normal and branched alkanes. Suitable operating conditions of the product stripper include a temperature of from about 20 to about 200° C. at the overhead, and a pressure from about 0 to about 1379 kPa absolute (0 to 200 psia).

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead, and a pressure from about 0 to about 2758 kPa absolute (0 to 400 psia). The LPG may be sold as valuable product, or it may be used in other processes such as a feed to a hydrogen production facility. Similarly, the naphtha may be used in other processes, such as the feed to a hydrogen production facility, a co-feed to a reforming process, or it may be used as a fuel blending component in the gasoline blending pool, for example.

The gaseous component separated in the product separator comprises mostly hydrogen, and the carbon dioxide from the decarboxylation reaction. Other components such as carbon monoxide, propane, hydrogen sulfide or other sulfur containing component, and possibly ammonia may be present as well.

It is desirable to recycle the hydrogen to the isomerization zone, but if the carbon dioxide is not removed, its concentration would quickly build up and effect the operation of the isomerization zone. The carbon dioxide can be removed from the hydrogen by means well known in the art such as reaction with a hot carbonate solution, pressure swing absorption, etc. If desired, essentially pure carbon dioxide can be recovered by regenerating the spent absorption media.

Similarly, a sulfur containing component such as hydrogen sulfide may be present to maintain the sulfided state of the deoxygenation catalyst or to control the relative amounts of the decarboxylation reaction and the hydrogenation reaction that are both occurring in the deoxygenation zone. The amount of sulfur is generally controlled, and it can be removed before the hydrogen is recycled. The sulfur components may be removed using techniques such as absorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide may be recycled to the reaction zone where hydrogenation primarily occurs and/or to any subsequent beds or reactors. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for producing biofuel from renewable feedstocks, the process comprising:
   deoxygenating the renewable feedstocks in a deoxygenation reaction zone,
   separating the deoxygenation reaction zone effluent in a first vapor-liquid separator into a vapor stream and a liquid stream wherein the first vapor-liquid separator is operated at a temperature from about 40 C to about 350 C;
   dividing the liquid stream into a recycle portion and a product portion;
   stripping the product portion of the liquid stream in a stripping column with a stripping gas into an overhead vapor stream and a bottoms stream wherein a level of contaminants in the bottoms stream of the stripping column after the first vapor-liquid separator is less than 1/100 of a level of contaminants in a bottoms stream of a stripping column without a vapor-liquid separator, and wherein the stripping column is operated at a temperature of from about 50 C to about 350 C;
   isomerizing the bottoms stream of the stripping column in an isomerization reaction zone;
   recycling the recycle portion of the liquid stream to the deoxygenation reaction zone;
   fractionating at least a portion of an effluent of the isomerization reaction zone to form at least one biofuel product stream.

2. The process of claim 1 further comprising:
   separating the effluent from the isomerization reaction zone in a second vapor-liquid separator into a second vapor stream and a second liquid stream; and introducing at least a portion of the second vapor stream into the stripping column as at least a portion of the stripping gas.

3. The process of claim 2 wherein the stripping gas consists of the at least the portion of the second vapor stream.

4. The process of claim 2 further comprising:
   combining the second liquid stream from the second vapor-liquid separator with the vapor stream from the first vapor-liquid separator, the overhead vapor stream from the stripping column, or both; cooling the combined stream; separating the combined stream in a third vapor-liquid separator into a third vapor stream and a third liquid stream; and wherein fractionating at least the portion of the effluent of the isomerization zone comprises fractionating the third liquid stream.

5. The process of claim 1 wherein the first vapor-liquid separator is run at a temperature in a range of about 40° C. to about 350° C.

6. The process of claim 1 wherein an outlet of the first vapor-liquid separator is positioned at a level above a level of a highest liquid inlet to the stripping column.

7. The process of claim 6 wherein there is a pump in fluid communication with the recycle portion of the liquid stream.

8. The process of claim 1 wherein there is a pump in fluid communication with the liquid stream before the liquid stream is divided.

9. The process of claim 1 further comprising pre-treating the renewable feedstocks in a pretreatment zone at pretreatment conditions to remove at least a portion of contaminants in the feedstock.

* * * * *